us008479789B2

(12) United States Patent  
Hill, III et al.

(10) Patent No.: US 8,479,789 B2  
(45) Date of Patent: Jul. 9, 2013

(54) SELF-PUMPING VENT HOLES FOR COOLING SOLID RUBBER TIRE AND METHOD OF CONSTRUCTION

(75) Inventors: Giles A. Hill, III, Idabel, OK (US); Duane S. Birdsong, Idabel, OK (US)

(73) Assignee: Giles A. Hill, III, Idabel, OK (US)

( * ) Notice: Subject to any disclaimer, the term of this patent is extended or adjusted under 35 U.S.C. 154(b) by 0 days.

(21) Appl. No.: 12/882,968

(22) Filed: Sep. 15, 2010

(65) Prior Publication Data

US 2011/0073228 A1 Mar. 31, 2011

Related U.S. Application Data

(60) Provisional application No. 61/242,523, filed on Sep. 15, 2009.

(51) Int. Cl.  
*B60C 7/10* (2006.01)

(52) U.S. Cl.  
USPC ............................................... 152/324; 152/7

(58) Field of Classification Search  
USPC .............. 152/1, 5, 7, 323, 324, 325, 327, 328  
See application file for complete search history.

(56) References Cited

U.S. PATENT DOCUMENTS

| | | | | |
|---|---|---|---|---|
| 1,026,468 A | * | 5/1912 | Selzer | 152/324 |
| 1,312,491 A | | 8/1919 | McClenathen | |
| 1,328,632 A | | 1/1920 | Kremer | |
| 1,449,549 A | * | 3/1923 | Loney | 152/324 |
| 1,500,786 A | | 7/1924 | Allen | |
| 1,548,843 A | | 8/1925 | Korn | |
| 1,552,081 A | | 9/1925 | Rett | |
| 1,616,843 A | * | 2/1927 | Brubaker | 152/324 |
| 1,670,827 A | | 5/1928 | Seiberling | |
| 1,813,758 A | | 7/1931 | Charles | |
| 1,877,988 A | | 9/1932 | Schrank | |
| 4,877,071 A | | 10/1989 | Tanigawa et al. | |
| 4,945,962 A | * | 8/1990 | Pajtas | 152/7 |
| 4,966,212 A | | 10/1990 | Hill et al. | |
| 4,998,980 A | * | 3/1991 | Katou | 152/324 |
| 5,053,095 A | | 10/1991 | Hill et al. | |
| 5,460,213 A | * | 10/1995 | Pajtas | 152/11 |
| D410,603 S | * | 6/1999 | Chandler et al. | D12/605 |
| 7,174,934 B2 | * | 2/2007 | Hill et al. | 152/209.17 |

(Continued)

FOREIGN PATENT DOCUMENTS

CH 446936 A 11/1967

*Primary Examiner* — Kip T Kotter  
(74) *Attorney, Agent, or Firm* — Osha • Liang LLP; John W. Montgomery

(57) ABSTRACT

A solid rubber tire with a multiplicity of self-pumping vent holes formed into opposed spaced apart sidewalls of the solid rubber tire. The self-pumping vent holes each extend from the side walls into the solid rubber tire about one-half the spaced apart distance and parallel to the rotation axis of the tire. Each of the multiplicity of self-pumping vent holes has a maximum cross-sectional dimension of between 0.5% and 1.5% of the maximum tire diameter. Any and all parts of the solid rubber material in the tire are at a distance of less than 12% of the original maximum diameter of the tire from any one of the multiplicity of self-pumping vent holes so that heat that may result in the solid rubber tire from its use is dissipated and temperature of the rubber in the tire is reduced by pumping of air into and out of the multiplicity of self-pumping vent holes upon rolling contact with the ground.

15 Claims, 6 Drawing Sheets

U.S. PATENT DOCUMENTS

| | | | |
|---|---|---|---|
| 7,174,936 B2 * | 2/2007 | Becker et al. | 152/325 |
| 7,198,687 B2 | 4/2007 | Hill, III et al. | |
| D548,681 S * | 8/2007 | Becker et al. | D12/605 |
| 7,334,617 B2 | 2/2008 | Hill, III et al. | |
| 7,726,049 B2 | 6/2010 | Hill, III et al. | |
| 2007/0029020 A1 * | 2/2007 | Wietharn et al. | 152/324 |

* cited by examiner

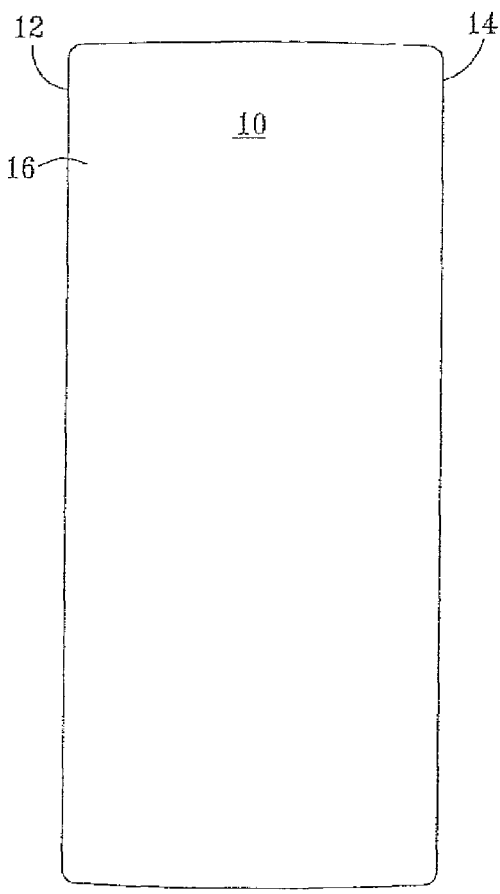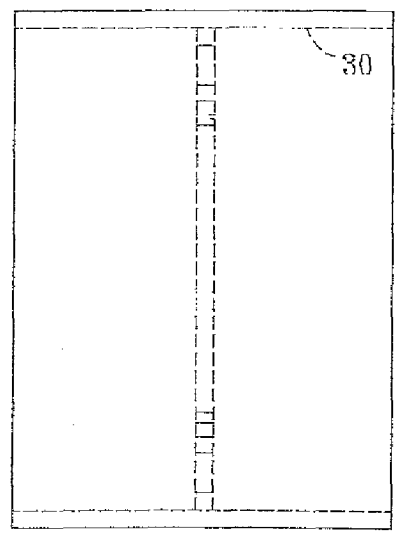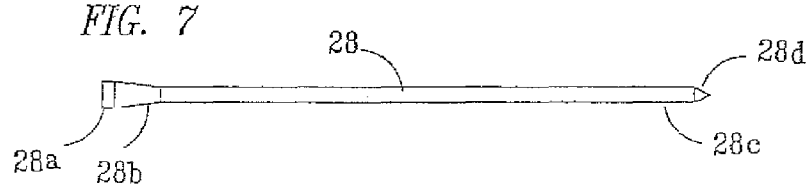

FIG. 8

| | DEGREES | TIRES THAT HAVE FAILED IN PAST ON TREAD WAS 240 DEGREES | | | | | |
|---|---|---|---|---|---|---|---|
| TREAD | 125 | | | | | | |
| RIM | 105 | | | | | | |
| FINAL DRIVE | 170-175 | 1ST @ RIM | 2ND | 3RD | 4TH | 5TH | 6TH |
| HOLES @ 4:00 POSITION | | 140 | 175 | 190 | 212 | 218 | 183 |
| REAR TIRES COOLER BY 50 DEGREES | | | | | | | |
| SIDEWALL OF TIRES | 125-140 DEGREES | | | | | | |
| | | | | | | | |
| RIGHT FRONT: OUTSIDE ROW | | 3RD ROW | | | | | |
| POSITION 12:00 | 190 | 12:00 | 155 | | | | |
| POSITION 4:00 | 220 | 4:00 | 190 | | | | |
| LEFT FRONT: OUTSIDE ROW | | 3RD ROW | | | | | |
| POSITION 12:00 | 150 | 12:00 | 150 | | | | |
| POSITION 4:00 | 183 | 4:00 | 190 | | | | |
| NOTICED NO DIFFERENCE IN TEMPERATURE ON TIRES THAT WERE BUFFED AND TIRES NOT BUFFED BUT THE .50" WOODEN DOWELL PIN WOULD GO INTO THE TIRE 2" FARTHER ON THE BUFFED TIRES. AT THE 6:00 POSITION | | | | | | | |

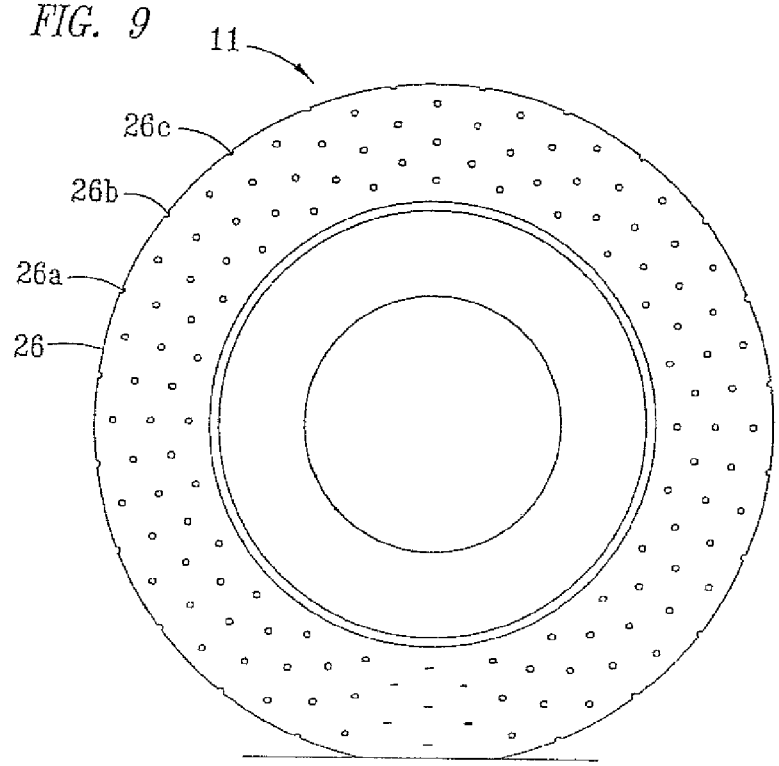
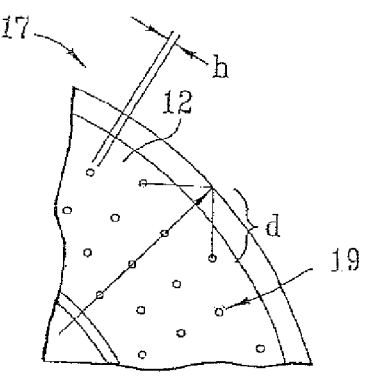

SELF-PUMPING VENT HOLES FOR COOLING SOLID RUBBER TIRE AND METHOD OF CONSTRUCTION

CROSS REFERENCE TO RELATED APPLICATION

This application claims priority to, and incorporates by reference in its entirety, U.S. Provisional Application No. 61/242,523 filed on Sep. 15, 2009.

BACKGROUND OF THE INVENTION

1. Field of the Invention

This invention relates generally to solid rubber tires of the type that may be bonded to wheels of vehicles and in particular to tire and wheel assemblies for heavy construction equipment.

2. Background Art

Solid rubber tires with a plurality of cushioning holes have been used on heavy construction equipment as shown in U.S. Pat. No. 7,174,934 to Giles A. Hill, III et al., the applicants herein, issued Feb. 13, 2007. Such tires have been constructed with side holes formed in the shapes of cylinders into the sidewalls of the tires oriented generally parallel with the axis of rotation and the diameters of the side holes were typically in the range of between about 1.5 inches and 6 inches in diameter to provide good cushioning with relatively few holes made into the solid rubber of the tire. A plurality of cushioning side holes were formed in several rings all closely spaced at small tire radii from the axis of rotation close to the wheel rim and spaced circumferentially around the rings at regular distances. The cylindrical cushioning holes were formed at the small tire radii inward from a wear layer of the tire to avoid wearing into the holes. Wearing into the cushioning holes could result in an uneven rolling surface due to the significant diameter of the voids that would be created by the cylindrical holes if the tread layer wore through. Thus, the wear layer of solid rubber extended a significant distance outward from the cushioning holes. In the past such solid rubber tires with cushioning holes have functioned well and have provided both cushioning and durability for the intended purposes in industrial environments of daily use.

SUMMARY OF INVENTION

It has been discovered by the applicants that in certain situations solid rubber tires have been called upon to operate substantially continuously 24 hours every day. For example, in a multiple shift industrial environment where separate operators of the vehicle runs the solid rubber tires during consecutive 8 hour shifts, substantially without any long period of discontinued use. According to one embodiment of the invention, it has been discovered by the inventors that excessive heat build-up in the wear layer of the solid rubber tire for heavy construction equipment can lead to accelerated deterioration and premature wear-out of the tire. It has been discovered that in environments of substantially continuous use without sufficient periods of non-use to allow dissipation of the excessive heat, a solid rubber tire with a built in cooling mechanism can reduce the heat build up in the tire and thereby reduce premature deterioration of the solid rubber tire.

According to one or more embodiment, a solid rubber tire is provided with a multiplicity of self-pumping vent holes formed into opposed spaced apart sidewalls of the solid rubber tire. The self-pumping vent holes each extend from the side walls into the solid rubber tire about one-half the spaced apart distance and generally parallel to the rotation axis of the tire. Each of the multiplicity of self-pumping vent holes has rounded cross-sectional shape and a maximum cross-sectional dimension of between 0.5% and 1.5% of the maximum tire diameter. The multiplicity of self-pumping vent holes are spaced from each other so that all of the solid rubber material forming the tire is at a distance of less than about 12% of the maximum diameter of the tire from any one of the multiplicity of self-pumping vent holes. Any excessive heat that may result in the solid rubber tire from its rolling use may be reduced by pumping of air into and out of the multiplicity of self-pumping vent holes upon rolling contact with the ground.

According to one or more embodiment, a solid rubber tire is provided with a multiplicity of self-pumping vent holes formed into opposed spaced apart sidewalls of the solid rubber tire. The self-pumping vent holes each extend from the side walls into the solid rubber tire about one-half the spaced apart distance and generally parallel to the rotation axis of the tire. According to one embodiment the multiplicity of self-pumping vent holes are formed in a plurality of rings at regularly spaced radii that extend into the wear layer of the tire to within a distance of within 12% of the maximum tire diameter of the wear layer so that the maximum space of any rubber in the wear layer is less than about 12% of the maximum diameter of the tire. The self pumping vent holes have rounded cross-sectional shapes and a maximum cross-sectional dimension of between 0.5% and 1.5% of the maximum tire diameter so that wearing into the vent holes does not create a significant void relative to the diameter of the tire. The multiplicity of self-pumping vent holes are spaced from each other so that all of the solid rubber material forming the tire is at a distance of less than about 12% of the maximum diameter of the tire from any one of the multiplicity of self-pumping vent holes. Any excessive heat that may result in the solid rubber tire from its rolling use may be reduced by pumping of air into and out of the multiplicity of self-pumping vent holes upon rolling contact with the ground.

According to one or more embodiments a solid rubber tire is provided with a multiplicity of self-pumping vent holes formed into opposed spaced apart sidewalls of the solid rubber tire, wherein each of the multiplicity of self-pumping vent holes has rounded cross-sectional shape and a maximum cross-sectional dimension of between about one-half inch (0.5 inch) and one and one fourth inches (1.25 inches). The multiplicity of self-pumping vent holes are spaced from each other so that all of the solid rubber material forming the tire, including the wear layer, is at a distance of less than about 9 inches from any one of the multiplicity of self-pumping vent holes. Any excessive heat that may result in the solid rubber tire from its rolling use may be reduced by pumping of air into and out of the multiplicity of self-pumping vent holes upon rolling contact with the ground.

Other aspects and advantages of the invention will be apparent from the following description and the appended claims.

BRIEF DESCRIPTION OF DRAWINGS

FIG. 5 is a front view of a solid rubber tire with self pumping vent holes according to one alternative embodiment of the invention shown in FIG. 4.

FIG. 6 is a partial side view of a rim for a solid rubber tire with self pumping vent holes according to one alternative embodiment of the invention shown in FIG. 4.

FIG. 7 is a front view of a molding pin useful for forming one self pumping vent hole in solid rubber tire according to one alternative embodiment of the invention shown in FIG. 4.

FIG. 8 is an example of results obtained in a test tires for testing the theoretical cooling concept of self pumping vent holes according to one embodiment of the invention.

FIG. 9 is a partial side view of a solid rubber tire with self pumping vent holes according partially worn into one ring of vent holes at the tread surface of the tire according to one alternative embodiment of the invention shown in FIG. 4.

FIG. 10 is a partial side view of a solid rubber tire with self pumping vent holes having a non circular rounded cross-sectional shape according to one alternative embodiment of the invention.

FIG. 11 shows an exploded view of a tire mold assembly according to one or more embodiments of the invention

DETAILED DESCRIPTION

Figure 1:
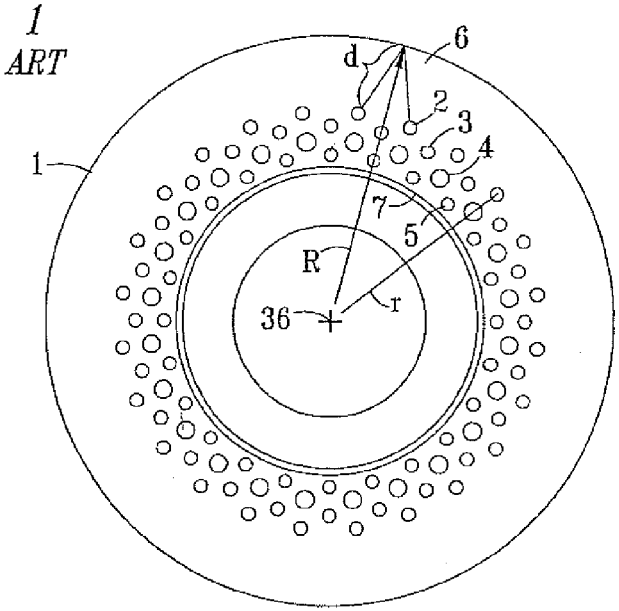
FIG. 1 is a side view representation of a prior art solid rubber tire with cushioning holes.

FIG. 1 shows a prior art solid rubber tire 1 with pluralities of cushioning holes 2, 3, 4, and 5 formed in a sidewall 6 of the tire 1. The holes are formed adjacent a rim 7 positioned in a ring having a small radius "r" that is less than about 80% of the maximum tire radius "R". The maximum distance "d" from any of the holes 2, 3, 4, or 5 to rubber in the tire tread is greater than abut 20% (i.e. d/R>20%).

Figure 2:
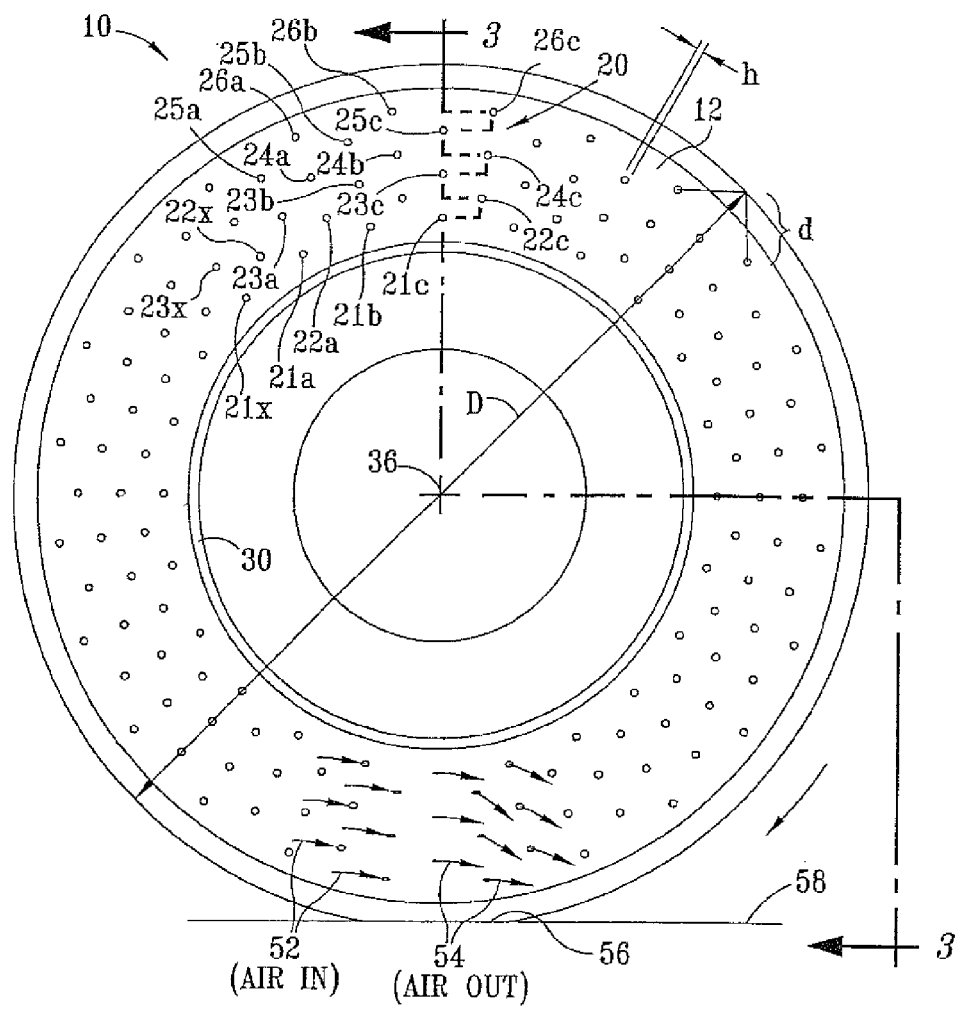
FIG. 2 is a side view of a solid rubber tire with self pumping vent holes according to one embodiment of the invention.

FIG. 2 shows a solid rubber tire 10 according to one or more embodiments of the invention with a multiplicity of self-pumping vent holes generally referred to with reference arrow 20 and specifically referred to with reference numbers 21a-x, 22a-x, 23a-x, 24a-x, 25a-x, and 26a-x (where the number represents a ring sometimes referred to as a row of self pumping vent holes and the subscripts a-x represent a sequence of holes) formed into one side wall 12 of the solid rubber tire 10. The plurality of self pumping vent holes 21a-x are formed spaced apart in a ring is formed in a ring pattern. Similarly, a multiplicity of self-pumping vent holes 41a-x, 42a-x, 43a-x, 44a-x, 45a-x, and 46a-x (not shown in the side view of FIG. 2, see FIG. 3) are formed into another side wall 14 opposed to and spaced apart from sidewall 12. In the embodiment shown there are 24 holes in each ring however it will be understood that the number of holes required to meet the spacing requirements for self pumping vent hole cooling according to certain aspects of the invention may be different. For example larger tires may require a greater number of holes and smaller tires might require fewer holes. The self-pumping vent holes 20 each extend from the side walls into the solid rubber tire about one-half the spaced apart distance and generally parallel to the rotation axis of the tire. Each of the multiplicity of self-pumping vent holes has rounded cross-sectional shape and a maximum cross-sectional dimension "h" of between about 0.5% and 1.5% of the maximum tire diameter "D" (i.e., about 0.5%<h/D<about 1.5%). The multiplicity of self-pumping vent holes 21a-x, 22a-x, 23a-x, 24a-x, 25a-x, and 26a-x and 41a-x, 42a-x, 43a-x, 44a-x, 45a-x, and 46a-x (not shown) are spaced from each other so that all of the solid rubber material forming the tire is at a distance "d" of less than about 12% of the maximum diameter D of the tire from any one of the multiplicity of self-pumping vent holes. Any excessive heat that may result in the solid rubber tire 10 from its rolling use may be reduced by pumping of air into (at 52) and pumping air out of (at 54) the multiplicity of self-pumping vent holes 21a-x, 22a-x, 23a-x, 24a-x, 25a-x, and 26a-x and 41a-x, 42a-x, 43a-x, 44a-x, 45a-x, and 46a-x (not shown) upon rolling contact of the tire 10 at 56 with the ground 58.

Figure 3:
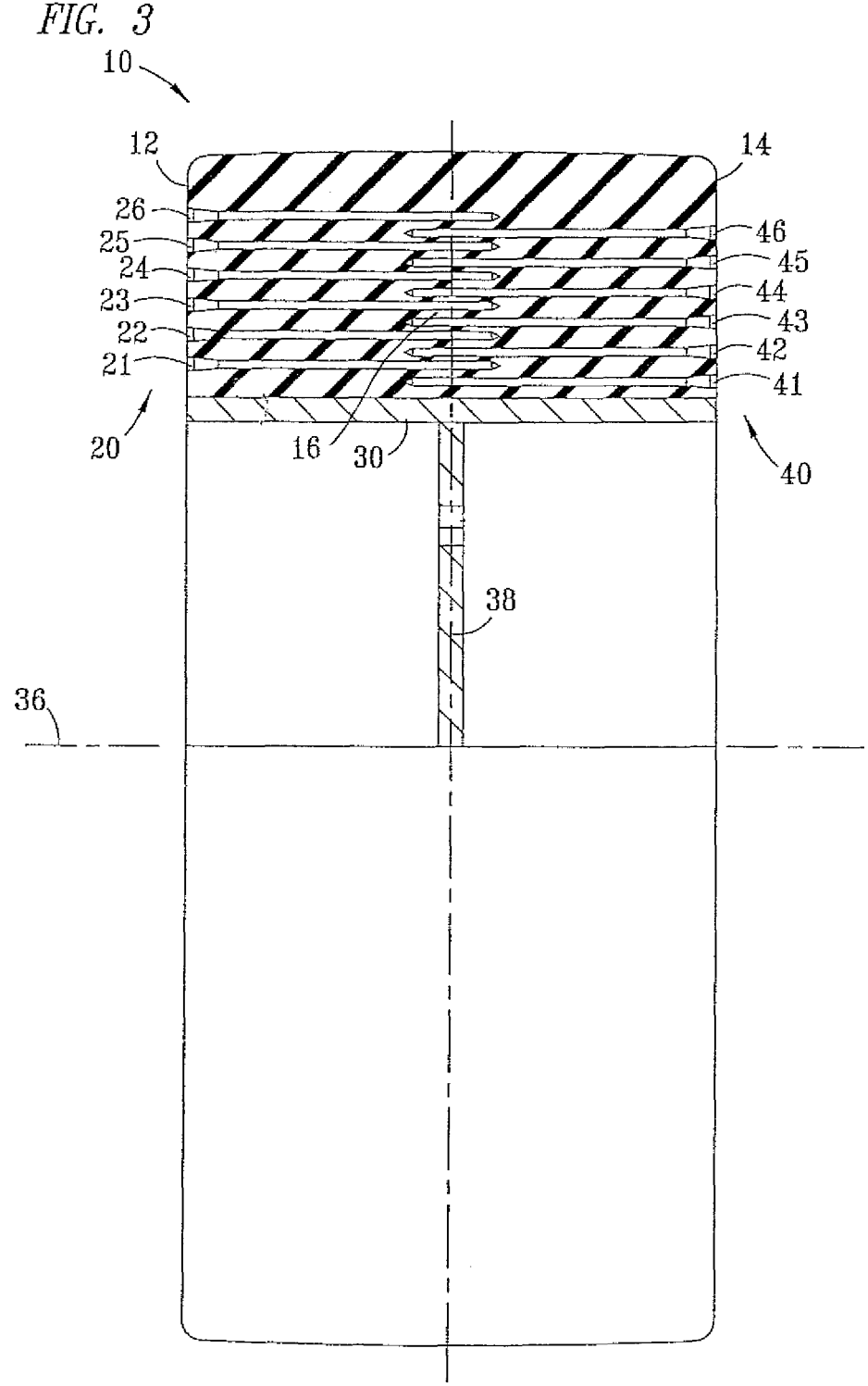
FIG. 3 is a partial cross-section front view of the a solid rubber tire with self pumping vent holes of FIG. 2, with the cross-section taken along section line 3-3, according to one embodiment of the invention.

In FIG. 3, a partial cross-section shows a plurality of self pumping vent holes generally by arrows 20 and 40 and specifically as 21, 22, 23, 24, 25, and 16 in side wall 12 of tire 10 and 41, 42, 43, 44, 45, and 46 formed into side wall 14 of tire 10. In one embodiment as shown the plurality of vent holes 20 and 40 extend into the tire 10 from opposed sides 12 and 14, respectively. They are positioned generally parallel to the axis 36 of rotation for the rim 30 and the solid rubber tire 10 mounted thereon. The vent holes 20 and 40 may extend inward in a range of from close to the midline 38 to overlapping as depicted in FIG. 3. While extending to close to the midline (wherein the plurality of vent holes extend into the tire to a maximum depth that is less than half the distance between the side walls of the tire) can meet the objective of vent holes within a short distance of all parts of the sold rubber tire for cooling of the rubber, overlapping (wherein the plurality of vent holes extend into the tire to maximum depth more than half the distance between the side walls of the tire) as shown in this embodiment can usefully provide additional cooling from the deepest parts of the solid rubber tire to facilitate cooling air flow from the depth of the vent holes. In one or more embodiments the internal rubber parts 11 of the tire are at a distance from the maximum depth of the vent holes that is less than about 12% of the original maximum tire diameter. In one or more embodiments as shown in FIG. 3, the vent holes may comprise hollow tubular holes 21-25 and 41-46 wherein the rounded cross sectional shape, viewed in the direction of wheel axis 36 has a smaller diameter at the deepest part (i.e., adjacent to a midline 38 between the sidewalls 12 and 14 as shown) and a larger diameter at the side walls 12 and 14 of the tire 10.

Figure 4:
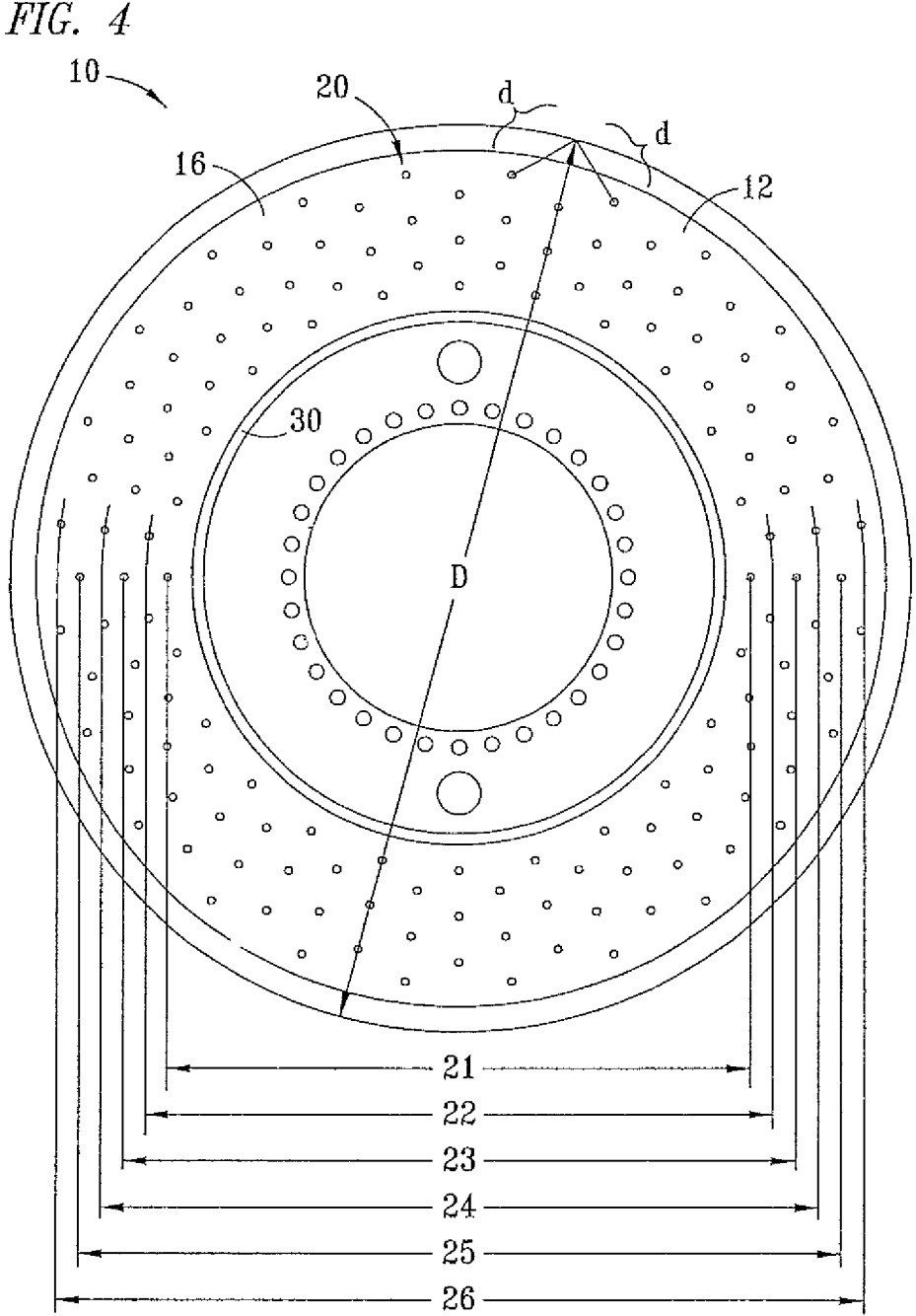
FIG. 4 is a side view of a solid rubber tire with self pumping vent holes according to one alternative embodiment of the invention.

In FIG. 4 an alternative embodiment is depicted of a tire 10 and rim 30 assembly, with example dimensions given in inches for forming rings of self pumping vent holes 20. In this embodiment there are rings of holes at six different radii or diameters 21 (47.5 inches), 22 (51.0 inches), 23 (54.5 inches), 24 (58.0 inches), 25 (61.5 inches) and 26 (65.0 inches). In each ring there are a plurality of holes at regular angular spacing.

FIG. 5 shows the front view and example dimensions of the tire of FIG. 4, for example, the tire diameter D 75.05 inches), the tire width (30 inches) and the tire midline (15 inches).

FIG. 6 shows a rim 30 onto which a tire 10 is molded according to one or more embodiments of the invention, including for example, the diameter (44.0 inches) and the width (30.0 inches).

FIG. 7 shows an example of a pin 28 useful for forming one of the plurality of vent holes 20 or 40. A plurality of pins 28 are secured to opposed sides in a tire mold (not shown) and the solid rubber is molded and vulcanized in the desired shape and size the tire and with the pins 28 embedded therein. In one or more embodiments the plurality of vent holes comprise hollow tubular holes wherein the rounded cross sectional shape comprises a non-circular rounded shape and in one or more embodiments the plurality of vent holes comprise hollow tubular holes wherein the rounded cross sectional shape comprises a circular rounded shape. As an example, for a tire as in FIG. 4 or FIG. 6, a total length (18.25 inches), and changing diameter along a length (17.5 inches), where the diameter varies along the length according to the example shown in FIG. 7 (1.0 inch at top at 28a, tapered to 0.5 inch at 28b, and tapered to 0.41 inch at 28c and to a pointed tip at 28d). The mold and the pins 28 are removed as by pulling opposed sides of the mold apart and the self pumping vent holes remain as voids in the vulcanized rubber 16 of the tire 10. The self pumping vent holes formed in the outermost ring or at the largest radius are closest to the outermost parts of the solid rubber 16 of the tire 10. The maximum distance d from any one of the holes to any part of the rubber 16 is relatively close so that a cooling gradient can be maintained.

In the embodiment depicted in FIG. 4, the solid rubber 16 located in the outermost diameter of the tire 10 appear to be at a farthest distance from any of the self pumping vent holes 20. The vent holes in the ring of vent holes designated 26 are at a maximum distance "d" from the outermost portion of the solid rubber tire. All other parts of the solid rubber 16, according to the dimensions indicated in this example FIG. 4 are, a shorter distance from at least one of the vent holes 20. Based upon calculation the distance d for this useful example embodiment of the invention are less than about 9 inches and in particular are less than about 12% of the maximum diameter D of the tire 10 (calculated as follows: d/D<0.12). In this embodiment, therefore, all other parts of the solid rubber tire, including the internal parts 11 of the tire 10 are at a distance from the maximum depth of the vent holes that is less than about 12% of the original maximum tire diameter D.

FIG. 8 is an example of results obtained in a test tires for testing the theoretical cooling concept of self pumping vent holes according to one embodiment of the invention. Temperature measurements are in degrees F. With six rows of vent holes the tires were cooler by 50 degrees F. compared to prior art tires that had failed at 240 degrees at the tread. In this test the heat build up appeared to be in the middle part of the solid rubber, at the $3^{rd}$, $4^{th}$ and $5^{th}$ rings of vent holes where the vent holes closest to the rim were designated the 1st row and the outermost ring of vent holes was designated the $6^{th}$ row. The $6^{th}$ row, i.e., adjacent to the tire tread was at temperature of 183 F, significantly lower than the 240 F temperature of prior art tires that failed.

FIG. 9 is a partial side view of a solid rubber tire 11 with self pumping vent holes wherein the outer tread surface layer of rubber of the tire 11 is partially worn off and into one ring 26 of self pumping vent holes 26a, b, c, . . . x. The small diameters of the rounded vent holes 26a, b, c, . . . x, usefully allows the tire to wear into the vent holes without causing large voids in the rolling tread surface. Rather the small diameter (0.5% to 1.5% of the tire diameter) means that the void is smaller or no larger than the amount of compression for purpose of pumping or no larger than a typical traction indentation for tread of other types of tires.

FIG. 11 is a perspective view showing an embodiment of a process for making a solid rubber tire with self-pumping vent holes. The process depicted in FIG. 11 comprises forming an uncured solid rubber material 70 into a generally cylindrically shaped solid rubber tire 72 around a central tire axis 74 and opposed side walls 76, and 78 spaced apart a distance from each other measured in a direction approximately parallel to the tire axis 74 and the opposed side walls 76, 78 extending from an interior diameter 82 outward to an outer diameter 84 of the cylindrically shaped solid rubber tire 70. A tire mold assembly 90 is formed having a mold cavity 92 and a mold closure 94. The mold cavity comprises a generally cylindrical rim 96 having a maximum interior diameter 98 around a central axis 100 and a first side 102 closing the mold cavity 92 at one end and the closure 94 having a second side 106 for closing the mold cavity 92 at the other end so that the closed cavity 92 and closure 94 form a cylinder with an inside diameter 98 and sides 102 and 104 spaced apart a distance 80 in the axial direction when they are assembled together. A first plurality of pins 110 (see side view of one embodiment of a pin 28 in FIG. 7) are formed attached to the side 102 in the mold cavity 92 in a spaced apart pattern (see FIG. 4) with each of the plurality of pins 110 spaced from each other a distance that is no greater than about 12% of the maximum inside diameter 98 of the cylindrical mold rim in one embodiment and no greater than about 9 inches in another embodiment. Each pin 110 having a rounded cross-section with a maximum dimension of between about 0.5% and 1.2% of the maximum inside cylindrical rim diameter in one embodiment and between about 0.5 inch and 1.25 inches in another embodiment. The pins 110 extend from the side 102 into the cavity 92 in a direction generally parallel to the axis 100 of the rim.

A second plurality of pins 112 are formed attached to the side 104 of the mold closure 94 in a spaced apart pattern with each of the plurality of pins 112 spaced from each other a distance that is no greater than about 12% of the maximum inside diameter of the cylindrical mold rim in one embodiment and no greater than about 9 inches in another embodiment. Each pin 112 having a rounded cross-section with a maximum dimension of between about between about 0.5 inch and 1.25 in one embodiment and extending from the side 104 of the closure 94 in a direction toward the cavity 92 side 102 generally parallel to the central axis 100 of the rim and extending a distance of about one-half of the distance between the cavity side 102 and the closure side 104 of the mold when the mold cavity assembly is closed together. The formed uncured rubber cylindrically shaped of the solid tire 70 is placed partially into the mold cavity 92 with the tire axis 84 generally aligned with the mold cavity axis 100. The mold closure 94 is placed in axial alignment with the mold cavity and with the uncured rubber cylindrically shaped solid tire 70. The closure 94 and mold cavity 92 are pressed together so that the pins 110 and 112 penetrate into the opposed sides 72 and 78 of the uncured rubber, cylindrically shaped solid tire material 70. The closure and mold cavity are held together with pressure and the uncured rubber cylindrically shaped solid tire 70 is heated and vulcanized in an autoclave, a with the solid rubber tire thereby molded in the cylindrical shape of the mold cavity 92 with the pins 110 and 114 penetrated into the sides 72 and 78 of the rubber tire. The closure 94 and pins 112 are removed and the cured solid rubber tire is removed from the cavity 92 and from the pins 110 so that vent holes each having a rounded cross-section with a maximum dimension of between about 0.5% and 1.2% of the maximum inside cylindrical rim diameter in one embodiment, and between about 0.5 inch and 1.25 inches in another embodiment, are formed in the opposed sides 72 and 78 of the vulcanized solid rubber tire.

According to one embodiment a solid rubber tire is disclosed for bonding to a wheel for rolling use on a vehicle. The solid rubber tire comprises a solid rubber material formed into a cylindrically shaped tire about a tire rotation axis including an interior surface for bonding to the wheel, an exterior tread surface at a maximum tire diameter, and opposed side walls spaced apart distance from each other side wall in a direction parallel to the rotation axis and extending from the interior surface to the exterior tread surface. A multiplicity of self-pumping vent holes are formed into the opposed spaced apart sidewalls of the solid rubber tire extending from each of the side walls into the solid rubber tire about one-half the spaced apart distance and substantially parallel to the rotation axis of the tire, and each of the multiplicity of self-pumping vent holes having a rounded cross-sectional shape and a maximum cross-sectional dimension of between about one-half inch (0.5 inch) and one and one fourth inches (1.25 inches) and each of the multiplicity of self-pumping vent holes spaced from each other of the self-pumping vent holes so that all of the solid rubber material in the tire is at a distance of less than about 9 inches from any one of the multiplicity of self-pumping vent holes, wherein any heat that may result in the solid rubber tire from rolling use of the tire is reduced by pumping of air into and out of the multiplicity of self-pumping vent holes upon rolling contact of the tire with the ground.

According to one embodiment the plurality of vent holes in the solid rubber tire extend into the tire less than half the distance between the sidewalls of the tire.

According to one embodiment the plurality of vent holes in the solid rubber tire extend into the tire more than half the distance between the sidewalls of the tire.

According to one embodiment the plurality of vent holes in the solid rubber tire comprise a cylindrical shape wherein the rounded cross sectional shape comprises a circular shape.

According to one embodiment, the plurality of vent holes in the solid rubber tire comprise hollow tubular holes wherein the rounded cross sectional shape comprises a non-circular shape. FIG. 10 shows a partial side view of an embodiment of a solid rubber tire 17 with a plurality of self pumping vent holes 19 having a non circular rounded cross-sectional shape according to one alternative embodiment of the invention.

According to one embodiment a method of making a solid rubber tire is disclosed. The method includes forming an uncured solid rubber material into a generally cylindrically shaped solid rubber tire around a central tire axis and opposed side walls spaced apart a distance from each other measured in a direction approximately parallel to the tire axis and the opposed side walls extending from an interior diameter outward to an outer diameter of the cylindrically shaped solid. The method includes forming a tire mold having a mold cavity and a mold closure, the mold cavity comprising a generally cylindrical rim having a maximum interior diameter around a central axis and a first side closing the mold cavity at one end and the closure having a side for closing the mold cavity at the other end so that closed cavity and closure form a cylinder with an inside diameter and sides spaced apart a distance in the axis direction. The method includes forming a first plurality of pins attached to the side in the mold cavity in a spaced apart pattern with each of the plurality of pins spaced from each other so that no space between the pins is at a distance greater than about 9 inches from a pin, each pin having a rounded cross-section with a maximum dimension of between about 0.5% and 1.2% of the maximum inside cylindrical rim diameter and extending from the side into the cavity in a direction generally parallel to the axis of the rim. The method includes forming a second plurality of pins attached in a spaced apart pattern to the side of the mold closure in a spaced apart pattern with each of the plurality of pins spaced from each other so that no space is a distance from a pin that is greater than about 9 inches, each pin having a rounded cross-section with a maximum dimension of between about 0.5 inch and 1.25 and extending from the side of the closure in a direction toward the cavity side generally parallel to the central axis of the rim and extending a distance of about one-half of the distance between the cavity side and the closure side of the mold when the mold cavity is closed. The method includes placing the formed uncured rubber, cylindrically shaped solid tire partially into the mold cavity with the tire axis generally aligned with the mold cavity axis. The method includes placing the mold closure in axial alignment with the mold cavity and the uncured rubber cylindrically shaped solid tire. The method includes pressing the closure and mold cavity molded together so that the pins penetrate into the opposed sides of the uncured rubber, cylindrically shaped solid tire material. The method includes holding the closure and mold cavity together with pressure, heating the uncured rubber cylindrically shaped solid tire in an autoclave, and vulcanizing the solid rubber tire in the cylindrical shape of the mold cavity with the pins penetrated into the sides of the rubber tire. The method includes removing the closure and pins and removing the cured solid rubber tire from the cavity and pins so that vent holes each having a rounded cross-section with a maximum dimension of between about 0.5 inch and 1.25 inches are formed in the sides of the opposed sides of the vulcanized solid rubber tire.

According to one embodiment a method of making a solid rubber tire is disclosed wherein forming a first and second plurality of pins attached in spaced apart patterns to the side in the mold cavity and to the side of the mold closure, respectively, comprises attachment of circular cross sectional shaped pins wherein the maxim cross sectional dimension is the diameter of the circular cross-section of the pins.

While the invention has been described with respect to a limited number of embodiments, and the discussion has focused on specific embodiments of solid rubber tires, those skilled in the art, having benefit of this disclosure, will appreciate that other embodiments can be devised which do not depart from the scope of the invention as disclosed herein. For example, differently shaped cross-section of the vent holes may also provide the benefits of self pumping of cooling air in to and out of the solid rubber tire as described without departing from the present invention. Accordingly, the scope of the invention should be limited only by the attached claims.

What is claimed is:

1. A solid rubber tire comprising:
    a solid rubber material formed into a generally cylindrically shaped tire for rotation around a tire rotation axis including an original maximum tire diameter, and opposed side walls spaced apart a distance from each other generally in a direction approximately parallel to the rotation axis and extending outward to the original maximum diameter of the tire; and
    a multiplicity of self-pumping vent holes formed into the opposed spaced apart sidewalls of the solid rubber tire, wherein each of the multiplicity of self-pumping vent holes extends from the side walls into the solid rubber tire to a depth of about one-half the spaced apart distance, wherein each of the multiplicity of self-pumping vent holes have a maximum cross-sectional dimension of between about 0.5% and 1.5% of the original maximum tire diameter, wherein the multiplicity of self-pumping vent holes are formed into the tire spaced from each other so that every part of the solid rubber material forming the tire is at a distance of less than about 12% of the original maximum diameter of the tire from any one of the multiplicity of self-pumping vent holes, such that the multiplicity of self-pumping vent holes thereby cool the solid rubber.

2. A solid rubber tire of claim 1, wherein the tire comprises internal rubber parts of the solid rubber material forming the tire and wherein the plurality of vent holes extend into the tire to a maximum depth that is less than half the distance between the side walls of the tire and so that the internal rubber parts of the tire are at a distance from the maximum depth of the vent holes that is less than about 12% of the original maximum tire diameter.

3. A solid rubber tire of claim 1, wherein the plurality of vent holes extends into the tire to maximum depth more than half the distance between the side walls of the tire.

4. A solid rubber tire of claim 1, wherein the plurality of vent holes comprise hollow cylinders wherein the rounded cross sectional shape comprises a circular shape.

5. A solid rubber tire of claim 1, wherein the plurality of vent holes comprise hollow tubular holes wherein the rounded cross sectional shape comprises a non-circular rounded shape.

6. A solid rubber tire of claim 1, wherein the plurality of vent holes comprise hollow tubular holes wherein the rounded cross sectional shape of the hollow tubular holes has a smaller diameter at a deepest part of the hollow tubular holes and a larger diameter at the side wall of the tire.

7. A solid rubber tire for bonding to a wheel for rolling use on a vehicle, comprising:
a solid rubber material formed into a cylindrically shaped tire about a tire rotation axis including an interior surface for bonding to the wheel, an exterior tread surface at a maximum tire diameter, and opposed side walls spaced apart a distance from each other side wall in a direction parallel to the rotation axis and extending from the interior surface to the exterior tread surface; and
a multiplicity of self-pumping vent holes formed into the opposed spaced apart sidewalls of the solid rubber tire extending from each of the side walls into the solid rubber tire about one-half the spaced apart distance and substantially parallel to the rotation axis of the tire, and each of the multiplicity of self-pumping vent holes having a rounded cross-sectional shape and a maximum cross-sectional dimension of between about 0.5% and 1.5% of the maximum tire diameter and each of the multiplicity of self-pumping vent holes spaced from each other of the self-pumping vent holes so that all of the solid rubber material in the tire is at a distance of less than about 12% of the maximum diameter of the tire from any one of the multiplicity of self-pumping vent holes, wherein any heat that may result in the solid rubber tire from rolling use of the tire is reduced by the multiplicity of self-pumping vent holes.

8. A solid rubber tire of claim 7, wherein the plurality of vent hole extend into the tire less than half the distance between the side walls of the tire.

9. A solid rubber tire of claim 7, wherein the plurality of vent hole extend into the tire more than half the distance between the side walls of the tire.

10. A solid rubber tire of claim 7, wherein the plurality of vent holes comprise a cylindrical shape wherein the rounded cross sectional shape comprises a circular shape.

11. A solid rubber tire of claim 7, wherein the plurality of vent holes comprise hollow tubular holes wherein the rounded cross sectional shape comprises a non-circular rounded shape.

12. A solid rubber tire of claim 7, wherein the plurality of vent holes comprise hollow tubular holes wherein the rounded cross sectional shape has a smaller diameter inside the rubber tire and a larger diameter at the side wall of the tire.

13. A method of making a solid rubber tire comprising:
forming an uncured solid rubber material into a generally cylindrically shaped solid rubber tire around a central tire axis and opposed side walls spaced apart a distance from each other measured in a direction approximately parallel to the tire axis and the opposed side walls extending from an interior diameter outward to an outer diameter of the cylindrically shaped solid;
forming a tire mold having a mold cavity and a mold closure the mold cavity comprising a generally cylindrical rim having a maximum interior diameter around a central axis and a first side closing the mold cavity at on end and the closure having a side for closing the mold cavity at the other end so that closed cavity and closure form a cylinder with an inside diameter and sides spaced apart a distance in the axis direction;
forming a first plurality of pins attached to the side in the mold cavity in a spaced apart pattern with each of the plurality of pins spaced from each other so that no space between the pins is at a distance from a pin that is greater than about 12% of the maximum inside diameter of the cylindrical mold rim, each pin having a rounded cross-section with a maximum dimension of between about 0.5% and 1.2% of the maximum inside cylindrical rim diameter and extending from the side into the cavity in a direction generally parallel to the axis of the rim;
forming a second plurality of pins attached in a spaced apart pattern to the side of the mold closure in a spaced apart pattern with each of the plurality of pins spaced from each other so that no space between the pins is at a distance from a pin that is greater than about 12% of the maximum inside diameter of the cylindrical mold rim, each pin having a rounded cross-section with a maximum dimension of between about 0.5% and 1.5% of the maximum inside cylindrical rim diameter and extending from the side of the closure in a direction toward the cavity side generally parallel to the central axis of the rim and extending a distance of about one-half of the distance between the cavity side and the closure side of the mold when the mold cavity is closed;
placing the formed uncured rubber, cylindrically shaped solid tire partially into the mold cavity with the tire axis generally aligned with the mold cavity axis;
placing the mold closure in axial alignment with the mold cavity and the uncured rubber cylindrically shaped solid tire;
pressing the closure and mold cavity mold together so that the pins penetrate into the opposed sides of the uncured rubber, cylindrically shaped solid tire material;
holding the closure and mold cavity together with pressure, heating the uncured rubber cylindrically shaped solid tire in an autoclave, and vulcanizing the solid rubber tire in the cylindrical shape of the mold cavity with the pins penetrated into the sides of the rubber tire;
removing the closure and pins and removing the cured solid rubber tire from the cavity and pins so that vent holes each having a rounded cross-section with a maximum dimension of 0.5% to 1.5% of the maximum diameter of the tire are formed in the sides of the opposed sides of the vulcanized solid rubber tire.

14. The method of making a solid rubber tire of claim 13, wherein forming the first and second plurality of pins attached in spaced apart patterns to the side in the mold cavity and to the side of the mold closure, respectively, comprises attachment of solid cylindrical shape pins wherein the rounded cross-sectional shape comprises a circular shape and the maximum cross-sectional dimension is the diameter of the circular cross-section of the pins.

15. The method of making a solid rubber tire of claim 13, wherein forming the first and second plurality of pins attached in spaced apart patterns to the side in the mold cavity and to the side of the mold closure, respectively, comprises attachment of tubular shaped pins wherein the rounded cross-sectional shape comprises a non-circular shape and the maximum cross-sectional dimension is the longest distance measured across the non-circular cross-sectional shaped pins.

* * * * *